United States Patent [19]

Itabashi

[11] Patent Number: 5,064,261

[45] Date of Patent: Nov. 12, 1991

[54] Fθ LENS SYSTEMS IN OPTICAL SCANNER

[75] Inventor: Akihisa Itabashi, Mitaka, Japan

[73] Assignee: Ricoh Company, Ltd., Tokyo, Japan

[21] Appl. No.: 528,619

[22] Filed: May 25, 1990

[30] Foreign Application Priority Data

May 31, 1989 [JP] Japan .................................. 1-137804

[51] Int. Cl.$^5$ ......................... G02B 26/08; G02B 3/04
[52] U.S. Cl. ..................................... 359/206; 359/662
[58] Field of Search ................................ 350/6.1–6.91, 350/432–434; 250/234–236

[56] References Cited

U.S. PATENT DOCUMENTS

| | | | |
|---|---|---|---|
| 4,836,630 | 6/1989 | Takanashi | 350/6.1 |
| 4,846,539 | 7/1989 | Takahashi | 350/433 |
| 4,859,011 | 8/1989 | Takanashi | 350/6.8 |
| 4,919,502 | 4/1990 | Yamakawa | 350/6.5 |
| 5,015,050 | 5/1991 | Itabashi | 350/6.8 |

FOREIGN PATENT DOCUMENTS 147316 8/1984 Japan .
120112 6/1986 Japan .

Primary Examiner—Rodney B. Bovernick
Assistant Examiner—James Phan
Attorney, Agent, or Firm—Oblon, Spivak, McClelland, Maier & Neustadt

[57] ABSTRACT

In an f θ lens system in an optical scanner, an approximately parallel light beam from a light source device is formed as a line image extending in a main scan-corresponding direction and is deflected at an equal angular velocity by a rotary polygon mirror having a reflecting face in the vicinity of the position of the formed line image. The deflected light beam is formed by an image forming lens system as an image in the shape of a spot on a scanned face to optically scan the scanned face at an approximately equal speed. The image forming lens system forms the light beam deflected by the rotary polygon mirror as an image on the scanned face. The f θ lens system includes a functional device having a function for setting a reflecting position of the rotary polygon mirror and the scanned face in an approximately conjugate relation in geometrical optics with respect to a cross scanning direction, and an fθ function with respect to a main scanning direction; and two groups of first and second lenses are sequentially arranged from the side of the rotary polygon mirror toward the scanned face side. The lenses have first to fourth lens faces which are counted from the side of the rotary polygon mirror and respectively have shapes of an arc, an arc, a straight line and an arc on a deflecting plane sequentially from the first lens face toward the fourth lens face.

8 Claims, 8 Drawing Sheets

Fig. 1a
MAIN 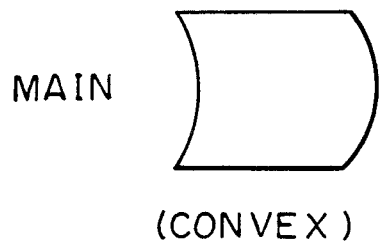
(CONVEX)
Fig. 1b
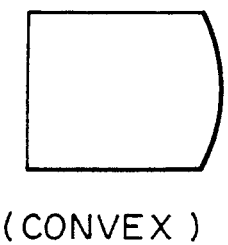
(CONVEX)
CROSS 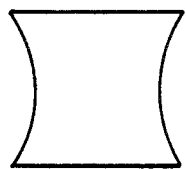
(CONCAVE)
Fig. 1c
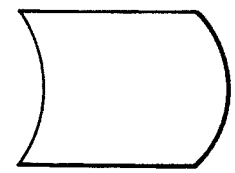
(CONVEX)
Fig. 1d

FNO = 54.7

-0.0005fM  0  0.0005fM

——— SPHERICAL ABERRATION

----- SINE CONDITION

θ = 29.5°

-0.01fM  0.01fM

θ = -29.5°

FIELD CURVATURE

θ = 29.5°

-0.50  0  0.50 fθ CHARACTERISTICS (%)

F_NO = 54.7

−0.0005fM  0  0.0005fM

—— SPHERICAL ABERRATION
----- SINE CONDITION

θ = 31.9°

−0.01fM  0.01fM

θ = −31.9°

FIELD CURVATURE

θ = 31.9°

−0.50  0  0.50 fθ CHARACTERISTICS (%)

F_{NO}= 54.7

-0.0005fM  0  0.0005fM

—— SPHERICAL ABERRATION
----- SINE CONDITION $\theta = 27.7°$

-0.01fM  0.01fM $\theta = -27.7°$

FIELD CURVATURE $\theta = 27.7°$

-0.50  0  0.50

$f\theta$ CHARACTERISTICS (%)

Fθ LENS SYSTEMS IN OPTICAL SCANNER

BACKGROUND OF THE INVENTION

1. Field of the Invention

The present invention relates to an fθ lens system in an optical scanner using a rotary polygon mirror.

2. Description of the Related Art

An optical scanner is known as a device for writing and reading information by performing an optical scanning operation of a light beam and is used in a laser printer, a facsimile, etc.

In such an optical scanner, there is a device of a system in which an approximately parallel light beam from a light source device is formed as a line image extending in a main scan-corresponding direction and is deflected at an equal angular velocity by a rotary polygon mirror having a reflecting face in the vicinity of the position of the formed line image. In this system, the deflected light beam is formed as an image in the shape of a spot on a scanned face by an image forming lens system to scan the scanned face.

In the optical scanner using the rotary polygon mirror, there is a problem about a so-called reflecting face inclination. Further, since the angular velocity of the rotary polygon mirror is constant, the scanned face is not scanned by the deflected light beam at a constant speed when a normal f.tan θ lens is used. Accordingly, it is necessary to dispose a means for performing the optical scanning operation at an equal speed. The fθ lens system is a lens system for performing the optical scanning operation at a constant speed with respect to this scanned face. This lens system has an fθ function constructed such that the height of an image formed by the light beam having an incident angle θ with respect to a lens optical axis is set to fθ when the focal length of the lens system is f.

As a method for solving the problem about the reflecting face inclination, there is a method in which a lens system disposed between the rotary polygon mirror and the scanned face is set to an anamorphic system and the scanned face and a light reflecting position of the rotary polygon mirror are set in a conjugate relation in geometrical optics with respect to a cross scanning direction.

There are various kinds of lens systems in which the fθ lens system is set to an anamorphic system to solve the problems about the optical scanning operation at a constant speed and the reflecting face inclination. For example, Japanese Patent Application Laying Open (KOKAI) No. 63-19617 shows an fθ lens system having two lenses. However, in this fθ lens system, field curvature is not necessarily corrected sufficiently and the diameter of a formed image spot on the scanned face is considerably changed in accordance with a scanning position so that it is difficult to perform the optical scanning operation of high density. Japanese Patent Application Laying Open (KOKAI) No. 61-120112 shows an fθ lens system having two lenses and using a so-called saddle type toric face to preferably correct field curvature. However, in this fθ lens system, two aspherical lens faces are used so that it is difficult to process the lenses and manufacturing cost is high.

SUMMARY OF THE INVENTION

It is therefore an object of the present invention to provide a novel fθ lens system for sufficiently correcting field curvatures in main and cross scanning directions and solving the problems about the reflecting face inclination in a rotary polygon mirror.

The above object of the present invention can be achieved by an fθ lens system in an optical scanner in which an approximately parallel light beam from a light source device is formed as a line image extending in a main scan-corresponding direction and is deflected at an equal angular velocity by a rotary polygon mirror having a reflecting face in the vicinity of the position of the formed line image and the deflected light beam is formed by an image forming lens system as an image in the shape of a spot on a scanned face to optically scan the scanned face at an approximately equal speed, the image forming lens system forming the light beam deflected by the rotary polygon mirror as an image on the scanned face. The fθ lens system comprising functional means having a function for setting a reflecting position of the rotary polygon mirror and the scanned face in an approximately conjugate relation in geometrical optics with respect to a cross scanning direction, the functional means having an fθ function with respect to a main scanning direction; and two groups of first and second lenses sequentially arranged from the side of the rotary polygon mirror toward the scanned face side. The lenses have first to fourth lens faces which are counted from the side of the rotary polygon mirror and respectively have shapes of an arc, an arc, a straight line and an arc on a deflecting plane sequentially from the first lens face toward the fourth lens face. The first lens face is constructed by a spherical face. The second lens face is constructed by a concave saddle type toric face having a radius of curvature on a deflecting perpendicular plane increased as this toric face is separated from an optical axis. The third lens face is constructed by a concave cylindrical face having refracting power only on the deflecting perpendicular plane. The fourth lens face is constructed by a convex toric face having large curvature on the deflecting perpendicular plane.

Further objects and advantages of the present invention will be apparent from the following description of the preferred embodiments of the present invention as illustrated in the accompanying drawings.

BRIEF DESCRIPTION OF THE DRAWINGS

FIGS. 1a to 1d are views for explaining the shape of an fθ lens system in the present invention;

DESCRIPTION OF THE PREFERRED EMBODIMENTS

Figure 2:
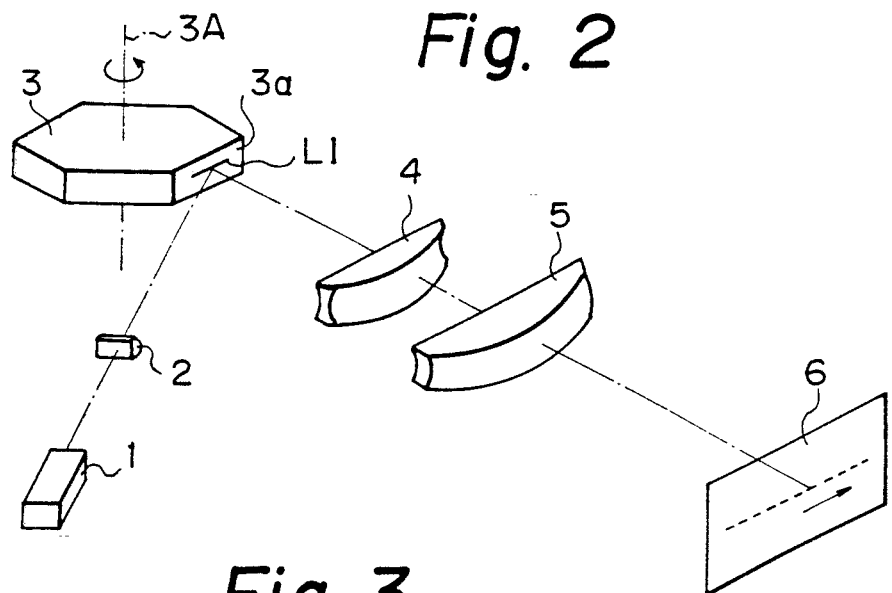
FIGS. 2 to 8 are views and graphs for explaining an optical scanner.

The preferred embodiments of an fθ lens system in an optical scanner in the present invention will next be described in detail with reference to the accompanying drawings.

In an fθ lens system in an optical scanner of the present invention, an approximately parallel light beam from a light source device is formed as a line image extending in a main scan-corresponding direction and is deflected at an equal angular velocity by a rotary polygon mirror having a reflecting face in the vicinity of the position of the formed line image. The deflected light beam is formed by an image forming lens system as an image in the shape of a spot on a scanned face to optically scan the scanned face at an approximately equal speed. The image forming lens system forms the light beam deflected by the rotary polygon mirror as an image on the scanned face. The fθ lens system comprises functional means having a function for setting a reflecting position of the rotary polygon mirror and the scanned face in an approximately conjugate relation in geometrical optics with respect to a cross scanning direction, and an fθ function with respect to a main scanning direction.

In this fθ lens system, two groups of first and second lenses are sequentially arranged from the side of the rotary polygon mirror toward the scanned face side. The lenses have first to fourth lens faces which are counted from the side of the rotary polygon mirror and respectively have shapes of an arc, an arc, a straight line and an arc on a deflecting plane sequentially from the first lens face toward the fourth lens face.

The first lens face is constructed by a spherical face. The second lens face is constructed by a concave saddle type toric face having a radius of curvature on a deflecting perpendicular plane increased as this toric face is separated from an optical axis. The third lens face is constructed by a concave cylindrical face having refracting power only on the deflecting perpendicular plane. The fourth lens face is constructed by a convex toric face having large curvature on the deflecting perpendicular plane.

A combined focal length $f_S$ of the lens system on the deflecting perpendicular plane and the radii $r'_1$, $r'_2$, $r'_3$ and $r'_4$ of curvature of the first to fourth lens faces on the deflecting perpendicular plane satisfy the following condition, $$0.07 < |[\{(1/r'_1)-(1/r'_2)\}+\{(1/r'_3)-(1/r'_4)\}] \cdot f_S| < 0.91 \qquad (I)$$

The respective lens faces of the fθ lens system of the present invention will next be described with reference to FIGS. 1a to 1d. In the specification of this application, a "deflecting plane" is a plane formed by moving a main light beam ideally deflected by the rotary polygon mirror. A "deflecting perpendicular plane" is a plane passing through an optical axis of the fθ lens system which is perpendicular to the above deflecting plane.

In FIGS. 1a to 1d, the left-hand side is a side of the rotary polygon mirror and the right-hand side is a side of the scanned face. Accordingly, first and second lenses are respectively arranged on the left-hand and right-hand sides in FIGS. 1a to 1d. First to fourth lens faces are sequentially arranged from the left toward the right. The upper views in FIGS. 1a and 1b show lens shapes of the fθ lens system on the deflecting plane and the lower views in FIGS. 1c and 1d show lens shapes of the fθ lens system on the deflecting perpendicular plane including the optical axis.

The deflecting plane corresponds to an ideal main scanning direction with respect to an intersection line between the deflecting plane and the scanned face. Therefore, the respective upper views in FIGS. 1a and 1b are shown as "main". Similarly, the deflecting perpendicular plane corresponds to a cross scanning direction. Therefore, the respective lower views in FIGS. 1c and 1d are shown as "cross".

As shown in the respective upper views in FIGS. 1a and 1b, the first to fourth lens faces on the deflecting plane sequentially have shapes of an arc, an arc, a straight line and an arc.

The respective views in FIGS. 1a to 1d also show that lens functions on the deflecting plane and the deflecting perpendicular plane are a "convex" or "concave" lens function.

The above condition (I) will next be explained.

It is possible to preferably correct field curvatures in the main and cross scanning directions by the above lens face construction of the fθ lens system.

However, it is necessary to further satisfy the above condition (I) to correct the field curvature in the cross scanning direction.

Namely, when the reflecting face inclination is corrected by the above lens face construction and the condition (I) is satisfied, a function for correcting the field curvature on a concave saddle type toroidal face constructing the second lens face is preferably fulfilled so that the field curvature in the cross scanning direction is preferably corrected.

When the absolute value in the condition (I) exceeds an upper limit thereof, the field curvature in the cross scanning direction is excessively increased. When the absolute value in the condition (I) exceeds a lower limit thereof, the field curvature in the cross scanning direction is excessively decreased.

Accordingly, when the condition (I) is not satisfied, it is difficult to perform an optical scanning operation of high density by an influence of the field curvature in the cross scanning direction.

Figure 3:
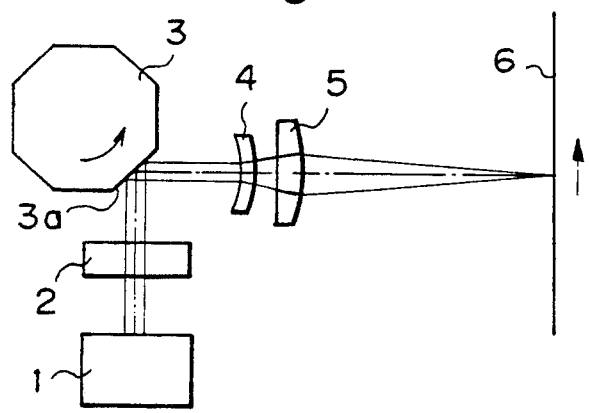

FIG. 2 schematically shows one example of an optical scanner using the fθ lens system. FIG. 3 shows a state in which an optical arrangement shown in FIG. 2 is seen from the cross scanning direction, i.e., the optical arrangement on the deflecting plane.

In FIG. 2, a parallel light beam is emitted from a light source device 1 composed of a light source or the light source and a condenser. This light beam is formed by a cylindrical lens 2 constituting a line image forming optical system as a line image LI approximately parallel to the deflecting plane in the vicinity of a reflecting face 3a of a rotary polygon mirror 3. A longitudinal direction of this line image is the main scan-corresponding direction.

The light beam reflected by the rotary polygon mirror 3 is formed by the fθ lens system as an image in the shape of a spot on a scanned face 6. The scanned face 6 is scanned at an equal speed by this light beam in accordance with the rotation of the rotary polygon mirror 3 at an equal speed in the direction shown by an arrow.

The fθ lens system is constructed by a first lens 4 disposed on the side of the rotary polygon mirror 3 and a second lens 5 disposed on the side of the scanned face 6. As shown in FIG. 3, the fθ lens system composed of the first and second lenses 4 and 5 sets infinity on the side of the light source device and the position of the scanned face 6 in a conjugate relation in geometrical optics on the deflecting plane.

Figure 4:
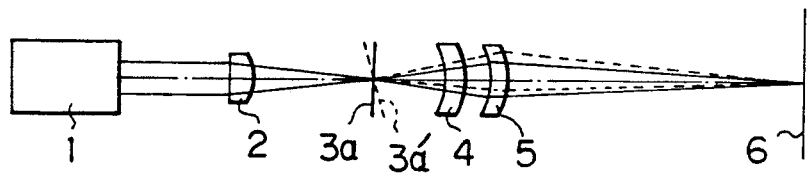

In contrast to this, the fθ lens system sets the reflecting position of the rotary polygon mirror 3 and the scanned face 6 in an approximately conjugate relation in geometrical optics on the deflecting perpendicular plane, i.e., in the cross scanning direction. Accordingly, as shown in FIG. 4, even when the reflecting face 3a is inclined as shown by reference numeral 3a', the position of an image formed by the fθ lens system on the scanned face 6 is not almost moved in the scanning direction (the vertical direction in FIG. 4) so that the reflecting face inclination is corrected.

Figure 5:
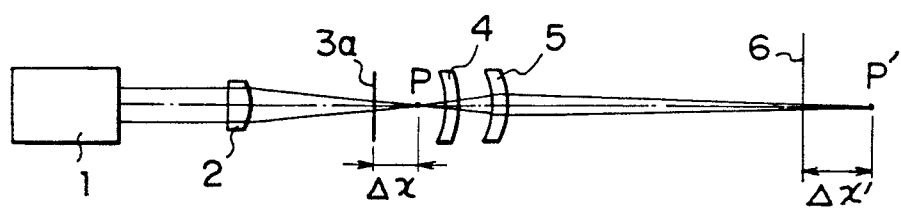

When the rotary polygon mirror 3 is rotated, the reflecting face 3a is rotated around an axis 3A. Therefore, as shown in FIG. 5, a shift $\Delta X$ in position is caused between the reflecting face 3a and the position P of the formed linear image by the rotation of the reflecting face. Thus, the position P' of a conjugate image of the linear image formed by the f$\theta$ lens system is shifted by distance $\Delta X'$ from the scanned face 6.

Figure 6:
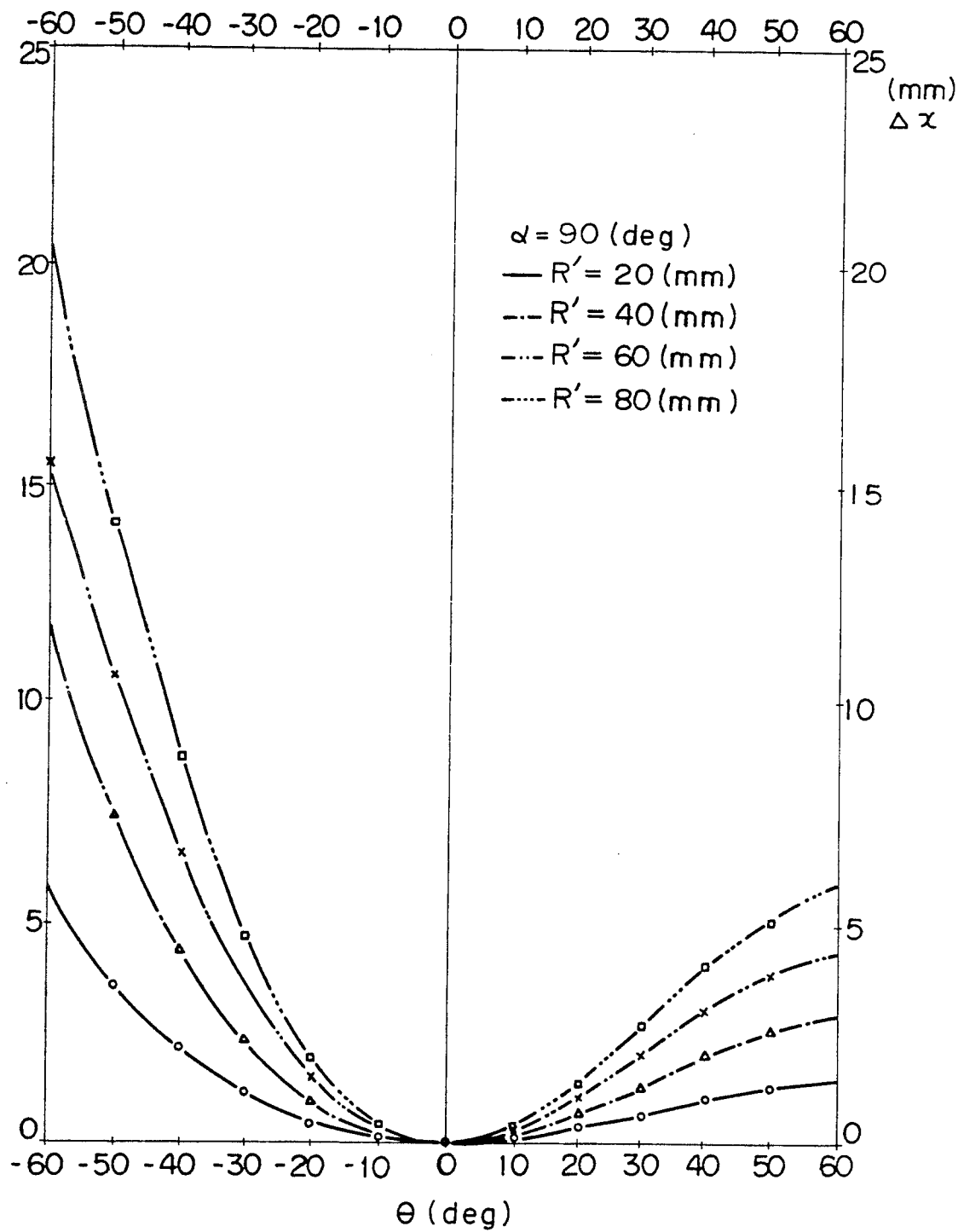
Figure 7:
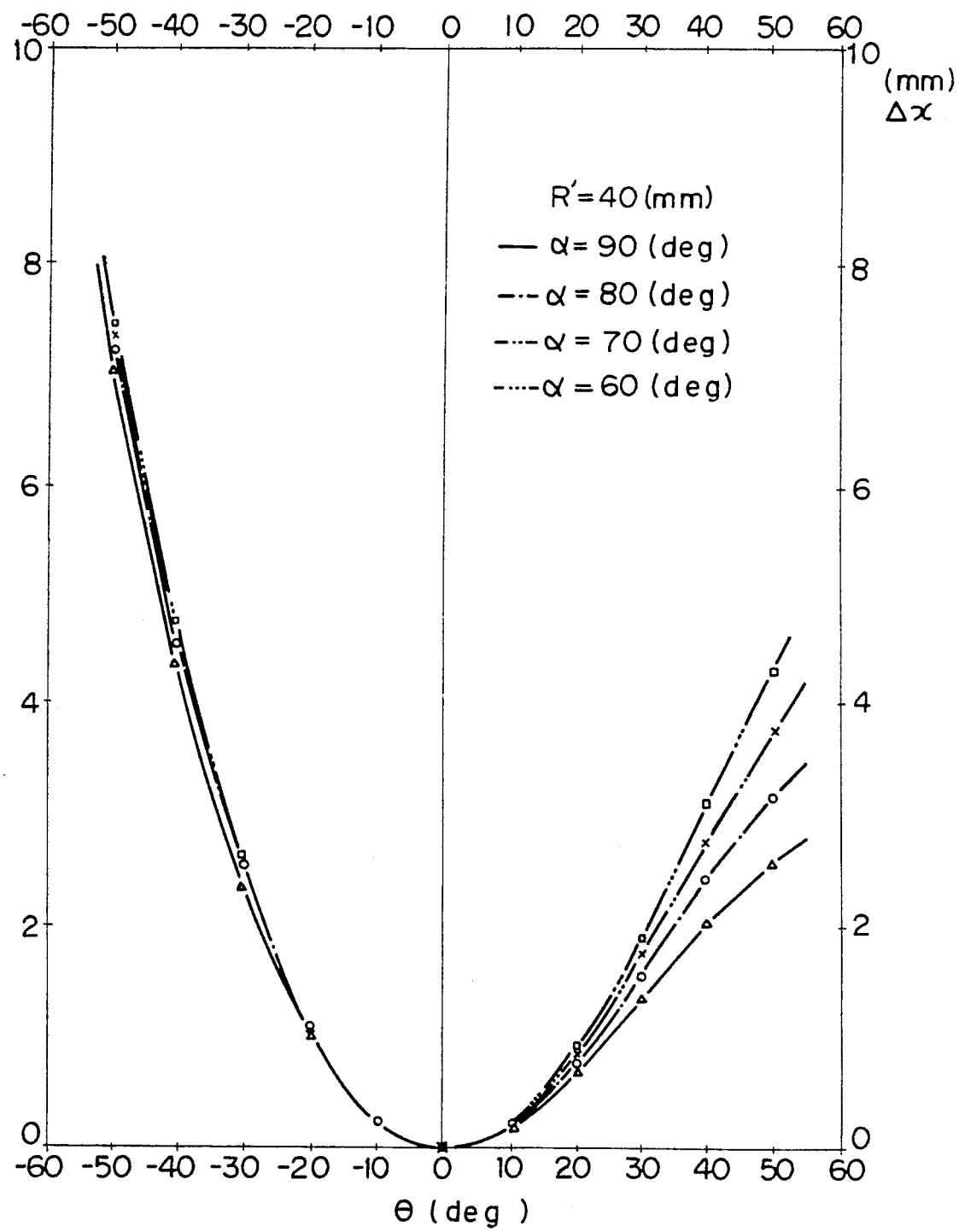

As is well known, this shift amount $\Delta X'$ is provided by $\Delta X' = \beta^2 \Delta X$ when the lateral magnification of the f$\theta$ lens system in the cross scanning direction is set to $\beta$. An angle formed between the optical axis of the f$\theta$ lens system and a deflected main light beam on the deflecting plane is set to $\theta$. FIGS. 6 and 7 show the relation between the angle $\theta$ and the above position shift $\Delta X$. In FIG. 6, an intrinsic incident angle $\alpha$ (see FIG. 8) is set to 90° and the radius R' of an inscribed circle of the rotary polygon mirror 3 is used as a parameter. In FIG. 7, the above radius R' of the inscribed circle is set to 40 mm and the intrinsic incident angle $\alpha$ is used as a parameter.

As can be seen from FIGS. 6 and 7, the position shift $\Delta X$ is increased as the radius R' of the inscribed circle is increased and the intrinsic incident angle $\alpha$ is decreased.

The relative shift in position between the reflecting face and the position of the linear image caused by the rotation of the reflecting face is caused two-dimensionally on the deflecting plane and is asymmetrically moved with respect to the optical axis of the lens system. Accordingly, in the optical scanner shown in FIG. 2, it is necessary to preferably correct field curvatures in the main and cross scanning directions of the f$\theta$ lens system. The f$\theta$ characteristics must be preferably corrected with respect to the main scanning direction.

Figure 8:
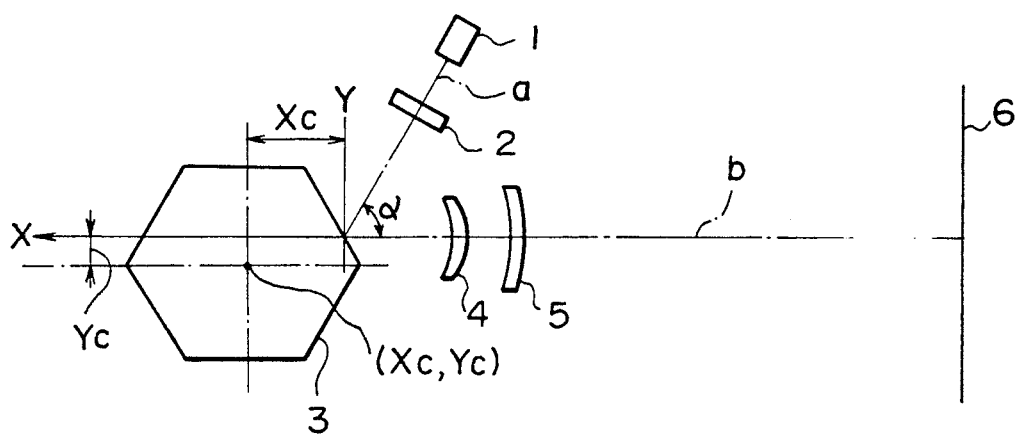

With respect to the above-mentioned intrinsic incident angle $\alpha$, reference numerals a and b in FIG. 8 respectively designate a main light beam incident to the rotary polygon mirror and an optical axis of the f$\theta$ lens system. The intrinsic incident angle $\alpha$ is defined as an intersection angle between the main light beam a and the optical axis b as shown in FIG. 8.

X and Y axes are determined as shown in FIG. 8 with the position of the intersection point between the main light beam a and the optical axis b as an origin. The position coordinates of a rotary axis of the rotary polygon mirror 3 are set to Xc and Yc.

As is well known, to reduce the change in position shift $\Delta X$ between the reflecting face and the position of the linear image as much as possible, it is sufficient to set the following conditions, $$0 < Xc < R \cos(\alpha/2)$$

$$0 < Yc < R \sin(\alpha/2)$$

with respect to the position coordinates Xc and Yc where R designates the radius of a circumscribed circle of the rotary polygon mirror.

When the number of reflecting faces of the rotary polygon mirror is set to N and the deflecting angle is set to $\theta$, it is sufficient to set the following condition, $$\theta < \alpha < (4\pi/N) - \theta$$

with respect to the above angle $\alpha$ so as to locate the incident main light beam a outside an effective main scanning region so that no return light from the scanned face 6 is again incident to a main scanning region of the scanned face as ghost light.

A saddle type toric face constructing one feature of the present invention will next be described.

As is well known, a toric face is a face provided by rotating an arc around a straight line which is located on a plane including this arc and does not pass through a center of curvature of the arc.

Figure 9:
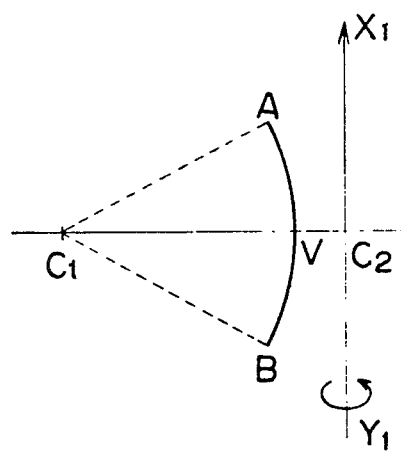
FIGS. 9 and 10 are views for explaining a saddle type toric face.
Figure 10:
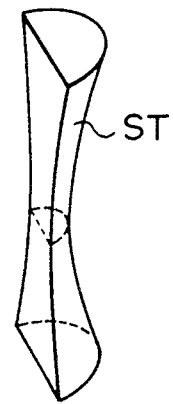

In FIG. 9, a curve passing through points A, V and B is an arc having position $C_1$ as a center of curvature. A saddle type curve ST shown in FIG. 10 is obtained by rotating this arc around a straight line $X_1Y_1$ located on the same plane as that of the arc and located on the side opposite to the center $C_1$ of curvature with respect to the arc. This curve ST constructs a saddle type toric face. It is possible to use this face ST as a convex or concave lens face. In the present invention, the second face is constructed by a concave saddle type toric face.

The radius of curvature of the saddle type toric face on a plane perpendicular to the $X_1Y_1$ axis is increased as this toric face is separated from point $C_2$ in the axial direction. This radius of curvature is equal to the distance between the $X_1Y_1$ axis and the arc AVB.

In the present invention, the direction of the $X_1Y_1$ axis is therefore set to be parallel to the main scanning direction on the deflecting plane.

The arc is located on the deflecting perpendicular plane including the optical axis with respect to the convex toric face constructing the fourth lens face. The rotary axis is parallel to the cross scanning direction on the above deflecting perpendicular plane and is located on the same side as that of the center of curvature of the arc. The radius of curvature of the above arc is smaller than the distance between the rotary axis and the arc. Accordingly, the curvature (the curvature of the above arc) of the above convex toric face on the deflecting perpendicular plane including the optical axis is larger than that on the deflecting plane.

The concrete Embodiments 1 to 3 of the present invention will next be described.

In the respective embodiments, reference numeral $f_M$ designates a combined focal length of the f$\theta$ lens system with respect to the main scanning direction, i.e., the combined focal length thereof on a plane parallel to the deflecting plane and is normalized to 100.

Reference numeral $f_S$ designates a combined focal length of the lens system with respect to the cross scanning direction. Reference numerals $2\theta$, $\alpha$ and $\beta$ respectively designate a deflection angle (unit: degree), the above intrinsic incident angle (unit: degree) and lateral magnification with respect to the cross scanning direction. Reference numeral $r_{iX}$ designates a radius of curvature of an i-th lens face on the deflecting plane counted from the side of the rotary polygon mirror, i.e., the radius of curvature of a lens face shown as "main" in the upper views of FIG. 1. Reference numeral $r_{iY}$ designates a radius of curvature of the i-th lens face on the deflecting perpendicular plane including the optical axis, i.e., the radius of curvature of a lens face shown as "cross" in the lower views of FIG. 1. Reference numerals $r_{1Y}$, $r_{2Y}$, $r_{3Y}$ and $r_{4Y}$ are explained as $r'_1$, $r'_2$, $r'_3$ and $r'_4$ in the above condition (I). Accordingly, with respect to the second lens face, reference numerals $r_{2X}$ and $r_{2Y}$ respectively designate the distance between the points V and $C_1$ in FIG. 9 and the distance between the points V and $C_2$. Reference numeral $d_1$ designates a distance between the i-th lens faces. Reference numeral $d_0$ designates a distance from the reflecting face of the rotary polygon mirror to the first lens face. Reference numeral $n_j$ designates refractive index of a j-th lens.

Further, reference numeral K designates the absolute value $$|[\{(1/r'_1)-(1/r'_2)\}+\{(1/r'_3)-(1/r'_4)\}] \cdot f_s|$$

in the above-mentioned condition (I).

EMBODIMENT 1

| $f_M = 100$, | $f_S = 22.104$, | $\beta = -3.053$, | | |
|---|---|---|---|---|
| $\alpha = 54$, | $2\theta = 59$ | $K = 0.077$, | $d_\rho = 7.816$ | |
| i | $r_{ix}$ | $r_{iy}$ | $d_i$ | j | $n_j$ |
| 1 | −16.358 | −16.358 | 3.968 | 1 | 1.71221 |
| 2 | −18.398 | 240.498 | 14.67 | | |
| 3 | ∞ | −24.05 | 4.329 | 2 | 1.675 |
| 4 | −69.023 | −9.674 | | | |

Figure 11A:
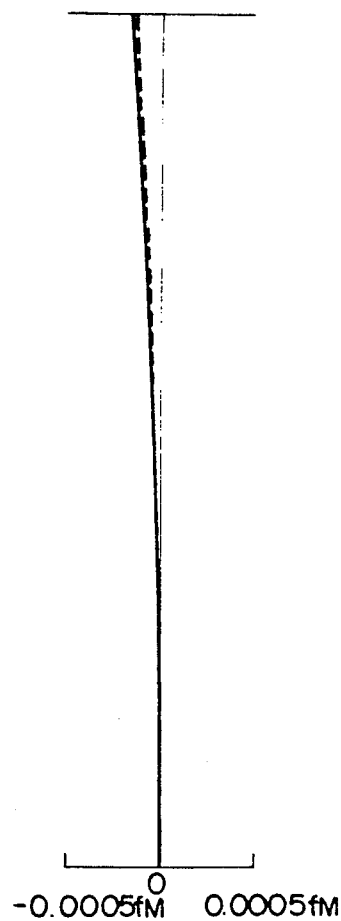
FIGS. 11a to 13c are aberration diagrams, diagrams showing field curvature and graphs showing fθ characteristics with respect to respective embodiments of the present invention.
Figure 11B:
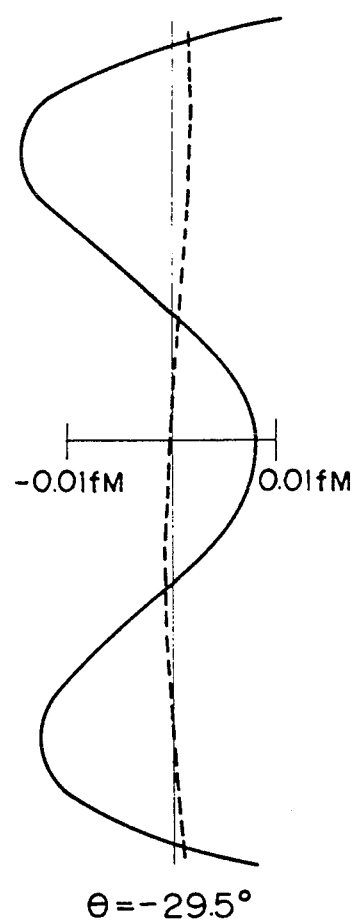
Figure 11C:
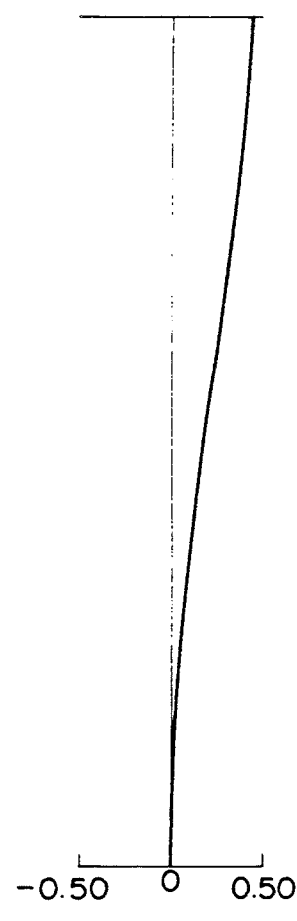

FIGS. 11a to 11c are respectively diagrams showing aberration, field curvature and a graph showing the $f\theta$ characteristics with respect to the Embodiment 1. The field curvature is caused by the rotation of the rotary polygon mirror and broken and solid lines respectively show field curvatures with respect to the main and cross scanning directions.

The $f\theta$ characteristics are defined by $$(h - f_M\theta) \cdot 100/(f_M\theta)$$

when the height of an ideal image is set to $f_M\theta$ and the height of the real image is set to h.

EMBODIMENT 2

| $f_M = 100$, | $f_S = 16.974$, | $\beta = -1.477$, | | |
|---|---|---|---|---|
| $\alpha = 54$, | $2\theta = 63.8$ | $K = 0.903$, | $d_\rho = 3.607$ | |
| i | $r_{ix}$ | $r_{iy}$ | $d_i$ | j | $n_j$ |
| 1 | −30.303 | −30.303 | 3.487 | 1 | 1.71221 |
| 2 | −29.341 | 15.632 | 38.961 | | |
| 3 | ∞ | −57.479 | 6.012 | 2 | 1.675 |
| 4 | −80.794 | −16.351 | | | |

Figure 12A:
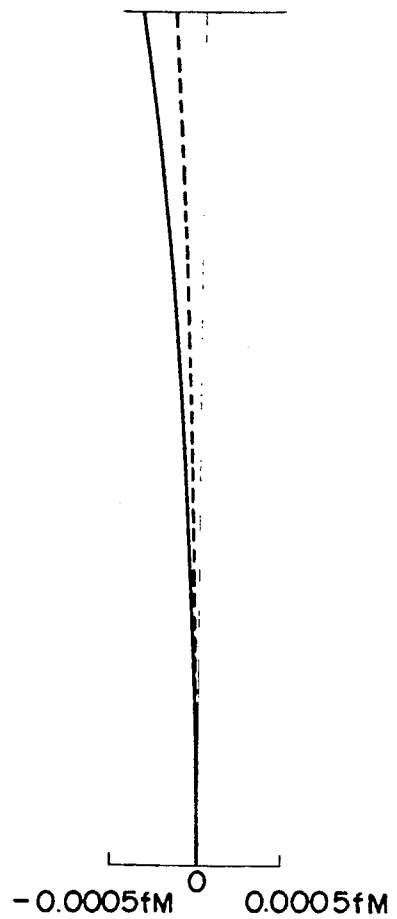
Figure 12B:
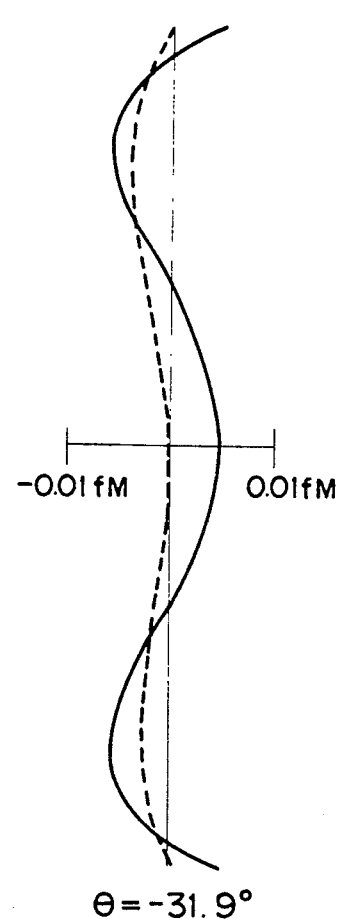
Figure 12C:
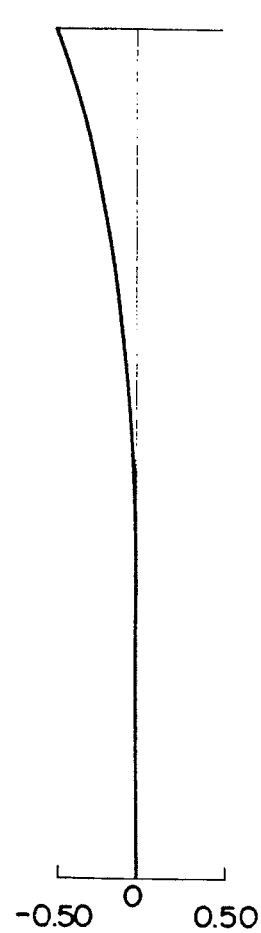

FIGS. 12a to 12c are respectively diagrams showing aberration, field curvature and a graph showing the $f\theta$ characteristics with respect to the Embodiment 2.

EMBODIMENT 3

| $f_M = 100$, | $f_S = 25.161$, | $\beta = -2.659$, | | |
|---|---|---|---|---|
| $\alpha = 54$, | $2\theta = 55.4$ | $K = 0.285$, | $d_\rho = 12.025$ | |
| i | $r_{ix}$ | $r_{iy}$ | $d_i$ | j | $n_j$ |
| 1 | −25.373 | −25.373 | 6.133 | 1 | 1.71221 |
| 2 | −27.778 | 192.399 | 11.905 | | |
| 3 | ∞ | −26.455 | 6.012 | 2 | 1.675 |
| 4 | −75.242 | −10.669 | | | |

Figure 13A:
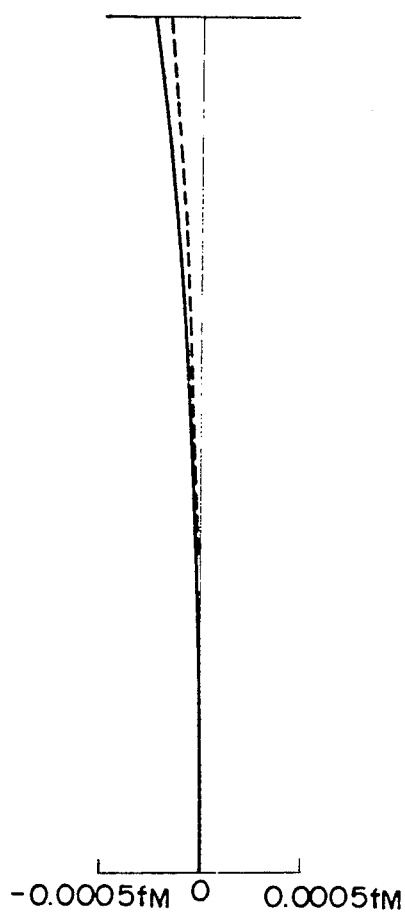
Figure 13B:
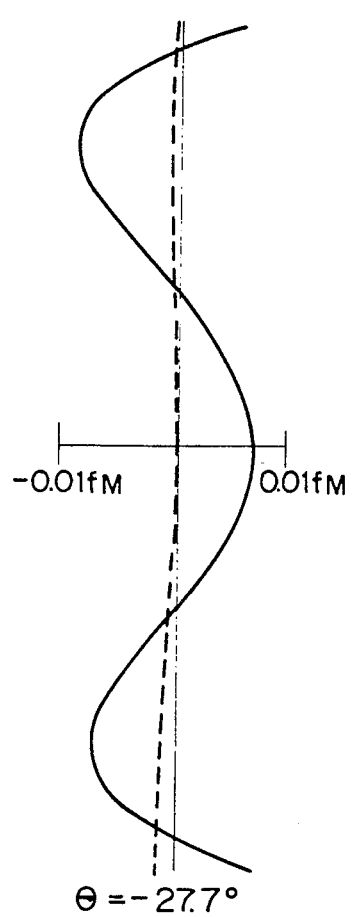
Figure 13C:
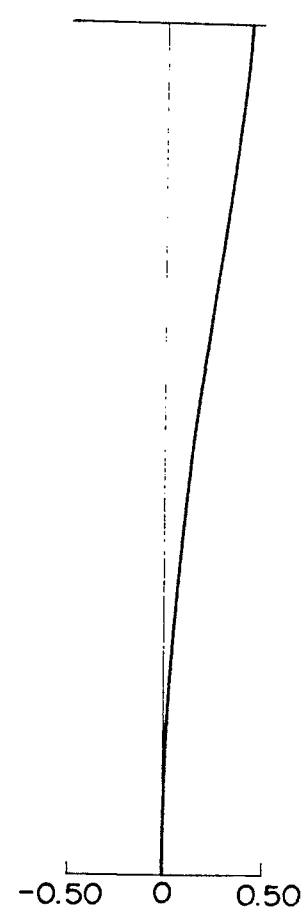

FIGS. 13a to 13c are respectively diagrams showing aberration, field curvature and a graph showing the $f\theta$ characteristics with respect to the Embodiment 3.

In the respective Embodiments, aberration is preferable and field curvature is especially corrected preferably in the main and cross scanning directions. Further, the $f\theta$ characteristics are also preferable. In the Embodiments 1 and 3, the radius of curvature of a concave saddle type toroidal face on the deflecting plane is smaller than that on the deflecting perpendicular plane including the optical axis. In the Embodiment 2, the radius of curvature of the concave saddle type toroidal face on the deflecting plane is larger than that on the deflecting perpendicular plane including the optical axis.

As mentioned above, in the above-mentioned $f\theta$ lens system in accordance with the present invention, field curvatures in the main and cross scanning directions are preferably corrected while the inclination of a reflecting face of the rotary polygon mirror is preferably corrected, thereby performing an optical scanning operation of high density.

Many widely different embodiments of the present invention may be constructed without departing from the spirit and scope of the present invention. It should be understood that the present invention is not limited to the specific embodiments described in the specification, except as defined in the appended claims.

What is claimed is:

1. An $f\theta$ lens system in an optical scanner in which an approximately parallel light beam from a light source device is formed as a line image extending in a main scan-corresponding direction and is deflected at an equal angular velocity by a rotary polygon mirror having a reflecting face in the vicinity of the position of the formed line image and the deflected light beam is formed by an image forming lens system as an image in the shape of a spot on a scanned face to optically scan the scanned face at an approximately equal speed, said image forming lens system forming the light beam deflected by the rotary polygon mirror as an image on the scanned face, said $f\theta$ lens system comprising:

functional means having a function for setting a reflecting position of the rotary polygon mirror and the scanned face in an approximately conjugate relation in geometrical optics with respect to a cross scanning direction, said functional means having an $f\theta$ function with respect to a main scanning direction; and two groups of first and second lenses sequentially arranged from the side of the rotary polygon mirror toward the scanned face side;

said lenses having first to fourth lens faces which are counted from the side of said rotary polygon mirror and respectively have shapes of an arc, an arc, a straight line and an arc on a deflecting plane sequentially from the first lens face toward the fourth lens face;

said first lens face being constructed by a spherical face;

said second lens face being constructed by a concave saddle type toric face having a radius of curvature on a deflecting perpendicular plane increased as this toric face is separated from an optical axis;

said third lens face being constructed by a concave cylindrical face having refracting power only on the deflecting perpendicular plane; and said fourth lens face being constructed by a convex toric face having large curvature on the deflecting perpendicular plane.

2. An $f\theta$ lens system as claimed in claim 1, wherein a combined focal length $f_S$ of the lens system on the deflecting perpendicular plane and radii $r'_1$, $r'_2$, $r'_3$ and $r'_4$ of curvature of said first to fourth lens faces on the deflecting perpendicular plane satisfy the following condition, $$0.07 < |[\{(1/r'_1)-(1/r'_2)\}+\{(1/r'_3)-(1/r'_4)\}]\cdot f_s| < 0.91.$$

3. An fθ lens system as claimed in claim 1, wherein said deflecting plane corresponds to the main scanning direction.

4. An fθ lens system as claimed in claim 3, wherein said deflecting perpendicular plane corresponds to the cross scanning direction.

5. An fθ lens system in an optical scanner in which an approximately parallel light beam from a light source device is formed as a line image extending in a main scan-corresponding direction and is deflected at an equal angular velocity by a rotary polygon mirror having a reflecting face in the vicinity of the position of the formed line image and the deflected light beam is formed by an image forming lens system as an image in the shape of a spot on a scanned face to optically scan the scanned face at an approximately equal speed, said image forming lens system forming the light beam deflected by the rotary polygon mirror as an image on the scanned face, said fθ lens system comprising:

functional means having a function for setting a reflecting position of the rotary polygon mirror and the scanned face in an approximately conjugate relation in geometrical optics with respect to a cross scanning direction, said functional means having an fθ function with respect to a main scanning direction; and two groups of first and second lenses sequentially arranged from the side of the rotary polygon mirror toward the scanned face side;

said lenses having first to fourth lens faces which are counted from the side of said rotary polygon mirror and respectively have shapes of an arc, an arc, a straight line and an arc on a deflecting plane sequentially from the first lens face toward the fourth lens face;

said first lens face being constructed by a spherical face;

said second lens face being constructed by a concave saddle type toric face having a radius of curvature on a deflecting perpendicular plane increased as this toric face is separated from an optical axis;

said third lens face being constructed by a concave cylindrical face having refracting power only on the deflecting perpendicular plane;

said fourth lens face being constructed by a convex toric face having large curvature on the deflecting perpendicular plane; and a combined focal length $f_S$ of the lens system on the deflecting perpendicular plane and radii $r'_1$, $r'_2$, $r'_3$ and $r'_4$ of curvature of said first to fourth lens faces on the deflecting perpendicular plane satisfying the following condition, $$0.07 < |[\{(1/r'_1)-(1/r'_2)\}+\{(1/r'_3)-(1/r'_4)\}]\cdot f_s| < 0.91.$$

6. An fθ lens system as claimed in claim 5, wherein said deflecting plane corresponds to the main scanning direction.

7. An fθ lens system as claimed in claim 6, wherein said deflecting perpendicular plane corresponds to the cross scanning direction.

8. An fθ lens system as claimed in claim 5, wherein said condition is satisfied to correct field curvature in the cross scanning direction.

* * * * *